Patented July 8, 1952

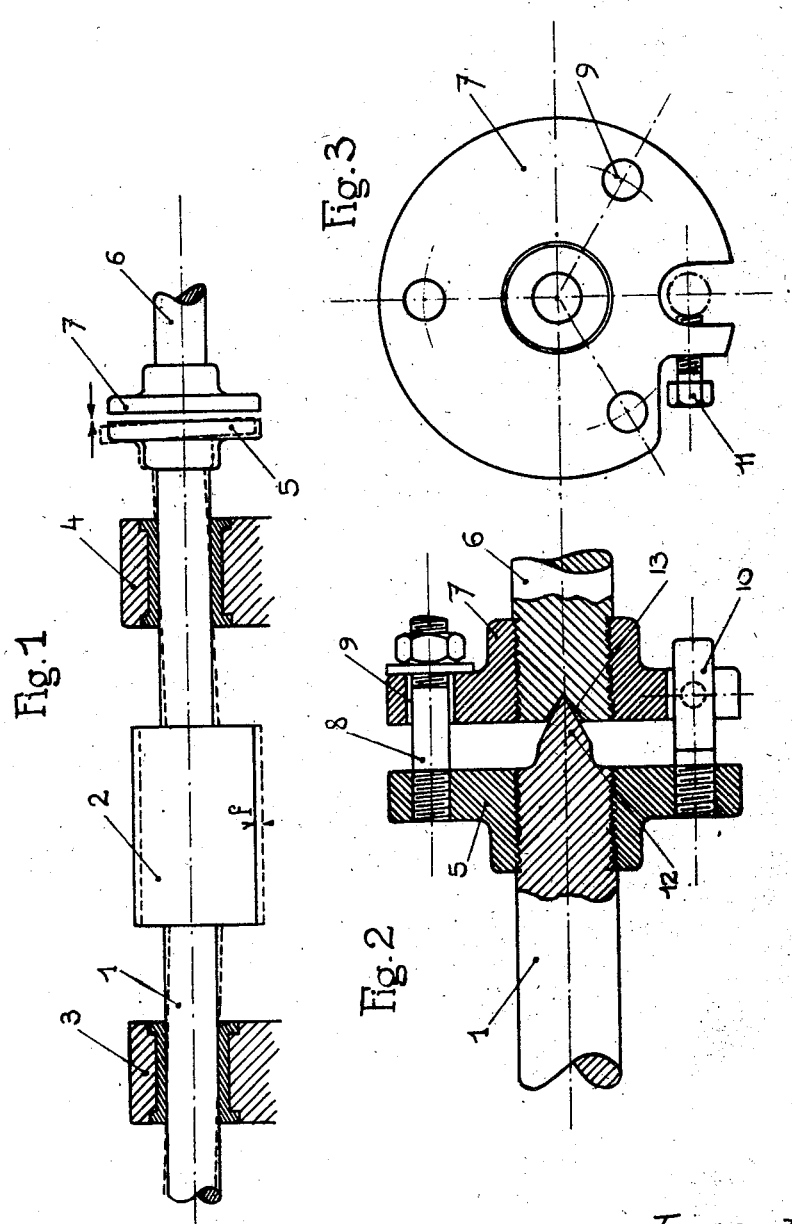

2,602,308

UNITED STATES PATENT OFFICE 2,602,308

DEVICE FOR RESTORING TRUENESS OF ROTARY SHAFTS

Maurice Bonnet, Paris, France, assignor to La Reliephographie, Societe pour l'Exploitation des Procedes de Photographie en Relief Maurice Bonnet, Paris, France, a French corporation Application October 30, 1945, Serial No. 625,604 In France February 6, 1943

Section 1, Public Law 690, August 8, 1946
Patent expires February 6, 1963

5 Claims. (Cl. 64—1)

This invention relates to a process and device for restoring trueness of rotary shafts, more particularly in lathes, and other machines tools.

In some machine tools, for example lathes, it is essential for a shaft which carries a work-piece (possibly between centres) to turn absolutely true since, otherwise, a lack of accuracy occurs in the machining operation.

This condition is particularly essential in the case of thread cutting lathes and machines of the same kind.

Hitherto, absolute straightness of the work-carrying shaft had endeavoured to be obtained by striving to the extreme for obtaining the accuracy of its machining and that of its mounting. This accuracy has been checked with a comparator and improved as far as possible by rectification of the shaft or its bearings. A method of this character is naturally very expensive. The present invention has for its object to provide means for eliminating very easily, on the machine itself, the eccentricity which the shafts may acquire. According to the invention, there is applied to shafts, having a bend in them, a continuous bending action which is exactly equal to the sag which they possess and which acts in the opposite direction thereto. It is thus possible, in each case, to obtain definite straightness, whether the eccentricity is due to defects in the shaft itself or in the centering of its coupling members. The bending stress is applied progressively until the phenomena caused by eccentricity of the shaft disappear completely. Straightening of the shaft is thus obtained without it being necessary to subject it to any treatment subsequently.

The accompanying drawing shows by way of example and diagrammatically a device which forms the subject of the present invention as applied to a machine for engraving the goffering dies for optical selectors having cylindrical lenticular elements.

In the drawing:

Figure 1 is an elevation of the device.

Figure 2 is a sectional view of a detail to a larger scale.

Figure 3 is an end view.

It will be seen that the shaft 1 which carries a work-piece 2 and of which the portion to be straightened is supported between two bearings 3 and 4 extends beyond bearing 4 and carries a flange 5.

A second shaft 6 which is co-axial with the shaft 1 and serves to drive the shaft 1 also carries a flange 7 corresponding with the flange 5. The shaft 6 itself is supported by another bearing, not shown, in the vicinity of the flange 7.

Referring now to Figures 2 and 3, it will be seen that the flange 5 carries three bolts loosely engaging smooth holes 9 provided in the flange 7. The flange 5 also carries, in the example shown, a driving dog 10 which co-operates with a stop screw 11 in the flange 7.

Finally, a centering centre-punch 12 is provided at the end of the shaft 1 and engages a corresponding recess 13 provided in the shaft 6. The angle at the apex of the centre-punch 12 is smaller than that of the recess 13 so as to allow of slight oscillation of the centre-punch 12. A predetermined space is provided between the two flanges 5 and 7.

In Figure 1 the full lines indicate the work-carrying shaft in the correct position and the chain dotted lines the position which it occupies before correction the shaft showing, for example, an eccentricity measured by the deflection $f$, between its two bearings. For the sake of clearness the eccentricity has been exaggerated considerably in the drawing.

By acting on the flanges through the medium of one or the other of the three bolts 8, in the direction indicated by the arrows in Figure 1, it is possible to apply to the shaft, which may be considered as a beam resting on the two supports formed by the two bearings, a bending action capable of compensating the deflection. It will thus be seen that the shaft is subjected to a permanent tension. It is necessary, therefore, to ascertain from time to time whether the adjustment which has been effected has not varied. The adjustment causes no difficulty and can be repeated as often as desired as no removal of metal is necessary.

It will be obvious that the stress applied to the flanges is the smaller the larger their diameter; in each case, the flanges must be of considerable thickness in order to possess sufficient rigidity for transmitting the bending stress to the shaft. It is possible to provide the shaft to be straightened with zones of reduced cross section so as to localize its bending to these zones.

It will be understood that the arrangement shown may be modified in various ways without departing from the scope and spirit of the invention. Thus, the centering centre-punch may be provided on the flanges themselves. The flange may also be replaced by an axial ball whilst the shaft to be straightened may be a shaft in two sections each of which terminates in a point: the problem being in ensuring accurate alignment of the two points. It is also possible to use an arrangement in which each end of the shaft is provided with a device similar to that just described.

Finally, it is to be observed that the invention which has been described above as applied to machine-tools may also be used in all the cases in which a shaft-line (transmission shaft, main shaft or the like) is to be straightened. In all these cases the shaft-line is subdivided into a predetermined numbr of sections each of which is provided with the device described.

Having now particularly described and ascertained the nature of my said invention and in what manner the same is to be performed, I declare that what I claim is:

1. In combination with a rotary shaft, chiefly for lathes and the like machine-tools, an arrangement for restoring the straightness of said shaft, comprising an auxiliary shaft co-axial with the shaft considered, two flanges facing one another and rigidly secured to the adjacent ends of the two shafts, means adapted to space from one other and the center one with reference to the other the two systems each including one of the shafts mentioned and the corresponding flange, and at least three tractional means adjustably interconnecting a number of corresponding points of the two flanges, for counteracting the sag shown by the first shaft.

2. In combination with a rotary shaft held in two bearings, chiefly for lathes and the like machine-tools, an arrangement for restoring the straightness of said shaft, comprising an auxiliary shaft co-axial with the shaft considered and in operative relationship therewith, two rigid flanges facing one another and rigidly secured to the adjacent ends of the corresponding shafts, means adapted to space from one other and to center one with reference to the other the two systems each including one of the shafts mentioned and the corresponding flange, one of said flanges being provided with peripheral recesses facing the other flange, at least three projections at the periphery of the side of the other flange facing the first mentioned flange, and adapted to engage the recesses therein, and means for holding the different projections at adjustable depths inside the corresponding recesses, for submitting the first shaft to a permanent bending stress counteracting the sag shown by said first shaft.

3. In combination with a rotary shaft held in two bearings, chiefly for lathes and the like machine-tools, an arrangement for restoring the straightness of said shaft, comprising an auxiliary shaft co-axial with the shaft considered, and in operative relationship therewith, two rigid flanges facing one another, and rigidly secured to the adjacent ends of the corresponding shafts, means adapted to space from one other and to center one with reference to the other the two systems each including one of the shafts mentioned and the corresponding flange, one of said flanges being provided with at least three peripheral apertures facing the other flange, at least three theaded bolts at the periphery of the side of the other flange facing the first mentioned flange and adapted to engage the apertures therein, and nuts for exerting on the bolts a tractional stress counteracting the sag shown by said first shaft.

4. In combination with a rotary shaft held in two bearings, chiefly for lathes and the like machine-tools, an arrangement for restoring the straightness of said shaft, comprising an auxiliary shaft co-axial with the shaft considered, two rigid flanges facing one another and rigidly secured to the adjacent ends of the corresponding shafts, a conical center hole corresponding to a flange, a conical center pin corresponding to the other flange, engaged in said centrehole and spacing the flanges one from the other, one of said flanges being provided with at least three peripheral apertures facing the other flange, at least three threaded bolts at the periphery of the side of the other flange, facing the first mentioned flange and adapted to engage the apertures therein, nuts for exerting on the bolts a tractional stress for submitting the first shaft to a permanent bending stress counteracting the sag shown by said first shaft, an axial pin rigid with one flange, and engaged in a corresponding recess of the other flange, a setting screw adjustably secured to said other flange, and adapted to operatively engage in said recess the pin rigid with the former flange, for the angular setting and driving of both shafts.

5. A shaft line, comprising a number of co-axial sections, a flange rigidly secured to a series of cooperating ends of adjacent sections means adapted to space from one another and to center one with reference to the other the different co-operating sections, at least three tractional means for adjustably interconnecting a number of corresponding points of the flanges on two cooperating section ends, for counteracting the sag in the sections considered, and restoring them to straightness, an axial pin rigid with one flange, and engaged in a corresponding recess of the other flange, a setting screw adjustably secured to said other flange, and adapted to operatively engage in said recess the pin rigid with the former flange, for the angular setting and driving of both shafts.

MAURICE BONNET.

REFERENCES CITED

The following references are of record in the file of this patent:

UNITED STATES PATENTS

| Number | Name | Date |
|---|---|---|
| 198,508 | Dowling | Dec. 25, 1877 |
| 527,632 | Verity | Oct. 16, 1894 |
| 828,826 | Prescott et al. | Aug. 14, 1906 |
| 2,389,885 | Anderson | Nov. 27, 1945 |